July 15, 1941.                D. MITCHELL                2,249,323
                             TESTING APPARATUS
                           Filed Aug. 11, 1937                2 Sheets-Sheet 1
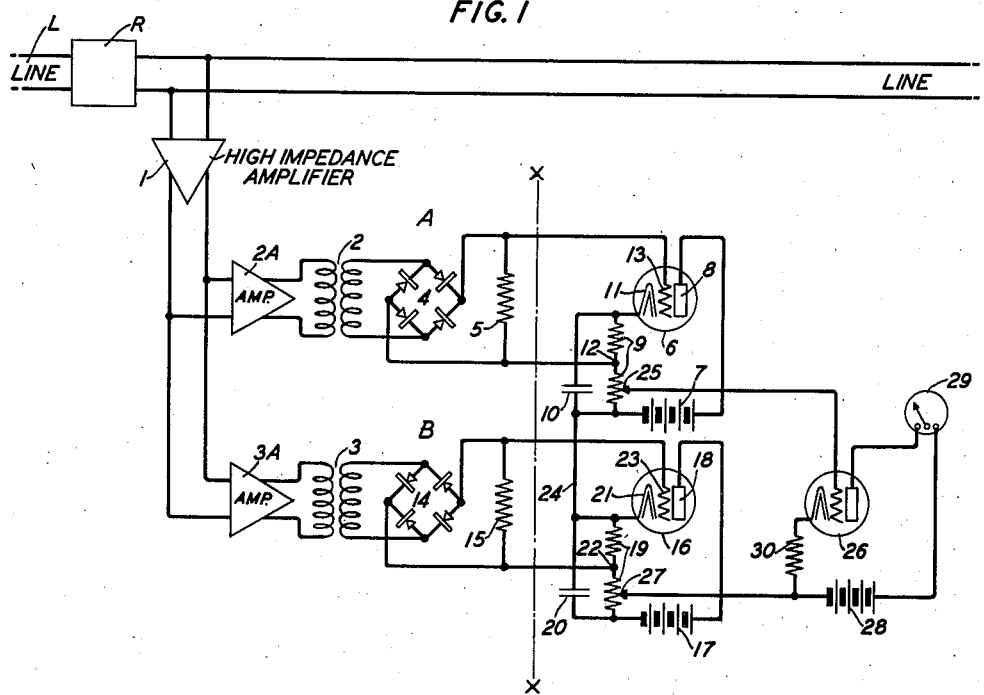
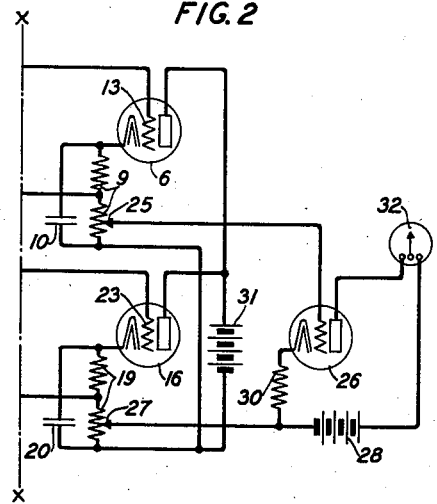
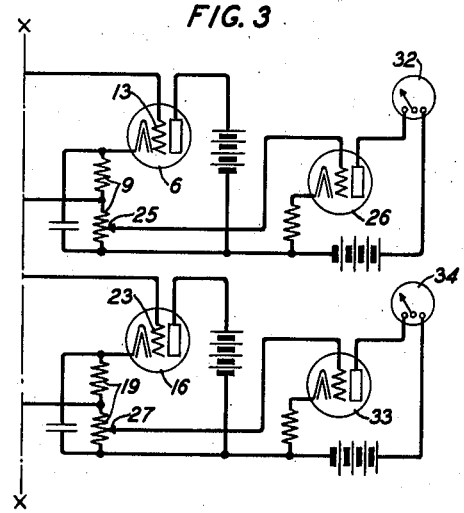
INVENTOR
D. MITCHELL
BY
ATTORNEY Patented July 15, 1941

2,249,323

UNITED STATES PATENT OFFICE 2,249,323

TESTING APPARATUS

Doren Mitchell, Bound Brook, N. J., assignor to Bell Telephone Laboratories Incorporated, New York, N. Y., a corporation of New York Application August 11, 1937, Serial No. 158,504

6 Claims. (Cl. 177—311)

This invention relates to testing apparatus and more particularly to means for monitoring the operation of a communication channel.

In certain types of communicating systems, it is essential that the level of the signal energy transmitted between stations be maintained within fixed maximum and minimum limits, in order to insure the reception of intelligible and satisfactory signals.

In such systems, it is highly desirable to have some means for monitoring the transmission and thereby ascertaining whether the line or communication channel is suitable for the transmission of signals which vary between fixed energy levels.

In its broad aspect, the invention provides a monitoring device which operates to control the production of an indication when the level of the energy transmitted over the channel exceeds either a maximum or a minimum prescribed value, for even a brief interval of time.

An object of the invention is to provide an improved arrangement for indicating changes in the level of the energy transmitted over a signal channel.

Another object of the invention is to provide an apparatus which operates to indicate undesired changes in either the maximum or minimum level of the energy transmitted over a signal channel.

Still another object is to provide an apparatus adapted to indicate changes of very brief duration in either the maximum or minimum level of the energy transmitted over a signal channel.

A feature of the invention relates to an apparatus including means whereby the energy of a level change of brief duration may be utilized to control the operation of a slow-acting indicator.

The invention will be hereinafter described as applied, by way of example, to monitoring the operation of a picture transmitting system, in which a picture modulated carrier current is transmitted over a communication channel or telephone line.

According to certain embodiments to be hereinafter described in detail, for the purpose of disclosing the principles of the invention, the monitoring device is connected across the signal channel by means of an amplifier provided with an input circuit of such high impedance that the amount of energy diverted from the channel is insufficient to interfere with efficient transmission of the picture signals to a remote station and an output circuit comprising two branches. Each branch includes a full wave rectifier connected by a coupling resistance to a vacuum tube, and the output circuit of each vacuum tube includes a condenser shunted by a leak resistance. Selected points on the respective leak resistances are connected to the input terminals of a third or controlled vacuum tube having a meter, or marginal relay adapted to control an indicator, included in its output circuit. The circuits of the third tube are so adjusted that the tube and indicator operate as a peak voltmeter, which is controlled by the two vacuum tube circuits supplied with rectified current.

The indicating means, therefore, comprises two controlling circuits, each of which includes a vacuum tube adapted to be supplied with rectified current corresponding in amplitude to the instantaneous value of the energy in the line or channel, associated with a peak voltmeter comprising a vacuum tube with an indicator included in its output circuit.

One of the control circuits is adjusted so that, when the level of the energy in the line increases, a rectified current of increased amplitude is supplied to the coupling resistance, the potential applied to the grid of the tube included in this circuit becomes more positive and hence the amplitude of the current flowing through its output circuit is increased to apply a charge to the condenser. When the level of the energy in the line decreases to a new value, the charge on the condenser leaks off through the resistance, the value of which should be large compared with the plate-to-cathode impedance of the tube. This circuit, therefore, responds quickly to an increase in the level of the input energy supplied to the tube, whereby the internal impedance of the latter is reduced to control the application of a charge to the condenser, and the associated leak resistance operates to maintain the charge in the condenser for some time after the level of the input energy decreases.

The other circuit responds quickly to a decrease in the level of the input energy to supply a rectified current of increased amplitude to the coupling resistance included therein, whereby the potential applied to the grid of the tube included in this circuit is rendered more positive, its internal impedance is reduced, and an increased current flows through its output circuit to apply a charge to the condenser. When the level of the energy in the channel increases, the potential applied to the grid of the tube becomes more negative, its output current decreases, and the charge in the condenser leaks off gradually through a resistance which is large compared with the plate-to-cathode impedance of the tube. This circuit, therefore, responds quickly to a decrease in level of the line energy, and the associated leak resistance operates to maintain the charge in the condenser for some time after the level of the line energy increases.

A portion of the voltage drop across the leak resistances, which are connected across the respective condensers, is used to control the potential applied to the grid of a vacuum tube voltmeter.

In one embodiment the drop of voltage across the two leak resistances due to changes in the charges applied to the condensers are added in such manner that, as the maximum value of the input energy increases or the minimum value of the input energy decreases, a positive potential of increased value is applied to the grid of the voltmeter tube and hence either an increase in the maximum or a decrease in the minimum of the input energy causes an increase in the current flowing through the output circuit of the vacuum tube voltmeter.

In another embodiment, these two voltages oppose each other, so that, if the input energy increases, a current of increased amplitude flows through the output circuit of the voltmeter tube, whereas, if the input energy decreases, the current flowing through the output circuit of the voltmeter tube decreases. In this embodiment, the current in the vacuum tube voltmeter is a measure of the average between the maximum and minimum amplitudes of the input energy, and hence this device can be used as a level indicator for a signal which varies between certain well-defined maxima and minima, as well as a hit detector which indicates if the signal rises above the prescribed maximum for a short time or falls below the prescribed minimum for a short time.

In a preferred embodiment of the invention, the minimum control or measuring circuit is somewhat different from that described above. In this embodiment, the signal current is rectified and is then used to control the gain of a variable attenuation circuit, which in turn controls the amplitude of the current supplied by a local oscillator. The control is such that when the signal current increases, the amplitude of the locally supplied oscillations is decreased and vice-versa. The output of this variable attenuation element is used to control a rectifier which charges up a condenser, across which is bridged a very high resistance. In this embodiment, when the signal current decreases, the amplitude of the locally supplied oscillations is increased, and the condenser is charged up rapidly through the rectifier impedance. If the signal amplitude later increases, the charge on the condenser leaks off gradually through the high resistance. A vacuum tube voltmeter is also used in this case to indicate the voltage across this resistance.

A detailed description of the invention follows and is illustrated in the attached drawings in which:

Fig. 1 diagrammatically illustrates a circuit embodying the invention;

Fig. 2 shows a circuit which may replace the portion of the circuit of Fig. 1 to the right of section line X—X;

Fig. 3 illustrates another circuit which may be substituted for the part of the circuit of Fig. 1 to the right of section line X—X.

Figure 4:
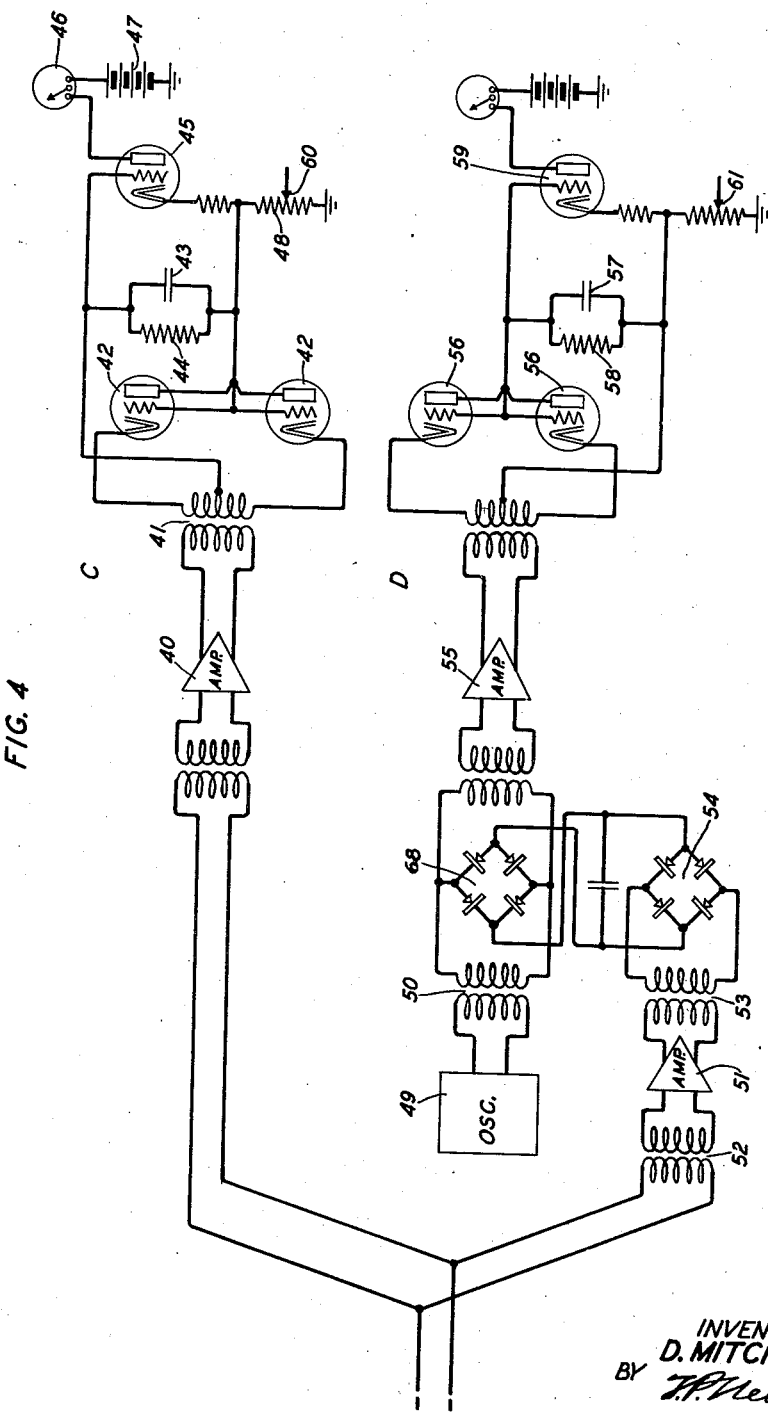
Fig. 4 illustrates a somewhat different type of circuit embodying the invention.

Signal current representative of a picture which is scanned for transmission comprises a unidirectional current including variations extending from substantially zero frequency to an upper limiting frequency of from several hundred cycles per second to several thousand cycles per second. Such a current cannot be satisfactorily transmitted over either a telegraph or a telephone line, because the former sharply attenuates the high frequency components while transmitting the lower frequency components substantially without attenuation, and the latter operates in the reversed manner, i. e., it sharply attenuates the low frequency components and transmits the high frequency components substantially without attenuation. In view of this condition, it is now the practice to transmit the picture current variations as modulations of a carrier current, the frequency of the carrier being so selected that the resulting modulation products, or a single side-band of such products, occupy a position in the frequency spectrum which corresponds to the efficient transmission range of a telephone line.

Terminal equipments which have been used to produce a picture modulated carrier current may comprise an optical means for producing a picture current which is combined with the carrier current in a modulator, or an optical system supplying a carrier modulated light beam associated with a picture carried by a drum, the optical system and drum being given such relative motion that the carrier modulated beam scans successive elemental areas of the picture and light reflected therefrom is directed to a light sensitive electric means which is thereby activated to control the production of the picture modulated carrier current. In certain cases, a filter is used to select one side-band of the modulation products for transmission to a distant receiving station, and to suppress the picture current produced by the light sensitive electric means. Suitable transmitting means for effecting the results, briefly described above, are disclosed, for example, in U. S. Patents 1,706,032 of M. B. Long, issued March 19, 1929, and 2,041,-822 of A. D. Dowd, issued May 26, 1936, respectively, to which reference may be made for a complete disclosure of the apparatus employed and the method of operating it. These transmitters operate to produce a carrier current which varies in amplitude between a minimum value, corresponding to a black elemental area of the picture, and a maximum value, corresponding to a white elemental area.

In Fig. 1, L is a line extending from a transmitting station, which may include a transmitter of the type disclosed in either of the above-mentioned patents to Long or Dowd, to a receiving station equipped with a receiver, corresponding to that disclosed by Long or Dowd.

The line or channel L may include apparatus units which from time to time operate in an undesired manner to cause the production of sudden changes in the level of the transmitted energy, or such changes may result from external conditions which affect the system. Although sudden changes of this character, called "hits," are of such short duration that they can only be detected by using extremely sensitive and delicate laboratory instruments which are not suitable for use in the field, they often produce level changes equal to several decibels, and hence cause the received picture to be distorted.

The apparatus to be hereinafter described operates to indicate "hits" of the type which cause distortion, measures their magnitude and retains this measurement long enough for it to actuate a comparatively slow operating recording meter, or a comparatively slow-acting relay which in turn controls the operation of an indicator. This apparatus can also be used to indicate maximum and minimum values of the varying energy caused by these "hits." Such an apparatus comprises elements which are commonly used in transmission systems, and it is well adapted to use in the field.

These "hits" may be of two types, namely, those caused by the undesired operation of apparatus units in the line, such as, for example, faulty operation of relays included or associated with such units or in the line itself, lightning discharges or energy surges in nearby circuits tending to cause currents of large amplitude to be produced in the line, or those due to short circuits across the line, undesired low impedance grounds applied thereto or other effects which tend to divert energy from the line.

Line L may include, for example, a repeating station R at which it is desired to monitor. This may be accomplished by providing a monitoring device having the characteristics outlined above, which is connected to the line by means of an amplifier 1 having a high impedance input circuit, whereby the value of the signal energy diverted from the line is so limited that it does not interfere with the efficient transmission of picture signals to the receiving station. The output circuit of the amplifier includes a repeating coil 2, an amplifier 2a, a repeating coil 3, and an amplifier 3a, the repeating coils respectively supply energy to two branch circuits A and B.

Circuit A includes a full wave rectifier 4 comprising a plurality of copper oxide rectifying elements, and a resistance 5 for coupling the rectifier to a vacuum tube 6. Space current is supplied to the tube by a source 7 having its positive terminal connected to the plate 8 and its negative terminal connected through a resistance 9 shunted by a condenser 10, to the cathode 11. A point 12 on the resistance 9 is connected, via resistance coupling 5, to the grid 13.

Current flowing through the output circuit of tube 6 causes point 12 to be more negative than cathode 11 by reason of the voltage drop across the part of resistance 9 connected between this point and the cathode, and this difference of potential is used to polarize the grid 13 negatively and thereby partially determine the amplitude of the current flowing through the output circuit.

One pair of diagonal terminals of the rectifier 4 are connected to the secondary winding of the repeating coil 2, while the other pair of diagonal terminals are connected to the coupling resistance 5. The rectifying elements, intervening between the pairs of terminals, are so poled that, when current is supplied to the rectifier, rectified current flows through the coupling resistance 5 in a direction to produce a positive potential at the terminal of this resistance which is connected to the grid 13. Thus when the energy flow through the line increases, a greater positive potential is applied to the grid tending to neutralize the negative polarizing potential derived from point 12 on resistance 9, and when the energy flow decreases, the grid becomes more negative again.

Circuit B includes a full wave rectifier 14, comprising a plurality of copper oxide rectifying elements, and a resistance 15 for coupling it to a vacuum tube 16. Space current is supplied to this tube by a source 17 having its positive terminal connected to the plate 18 of tube 16 and its negative terminal connected through a resistance 19, shunted by a condenser 20, to the cathode 21. A point 22 on the resistance 19 is connected through the coupling resistance 15 to the grid 23, whereby, upon the flow of current through this tube and its output circuit, the grid 23 is negatively polarized with respect to cathode 21.

Circuit B operates in a manner opposite to circuit A. That is, the elements of the rectifier 14 are so poled that when the energy applied to its input terminals decreases, a decreased rectified current flows through the coupling resistance 15 in such a manner that a lower negative potential is produced at the terminal connected to the grid 23. Thus, when the energy flowing through the line is reduced, a less negative potential is applied to the grid 23 thereby tending to decrease the negative biasing potential and, when the energy flow in the line again increases, the grid is more negatively polarized.

The circuit of the control tube 6 is so designed that, with no signal current transmitted over the line, a current of selected amplitude flows through its plate circuit and produces a comparatively large voltage drop across the portion of resistance 9 between the cathode and tap 12, with the result that this tap is considerably negative with respect to its associated cathode. This high negative potential being applied to the grid 13 serves to limit the current flowing through the output circuit of tube 6 to the desired value. In the case of tube 16, on the other hand, most of the negative bias on the grid, even when no signal is being transmitted (carrier at its low level), is due to the voltage drop across resistance 15 produced by such rectified carrier as is present.

The resistance-condenser combinations 9—10 and 19—20 each comprise a resistance that is large compared with the cathode-to-plate impedance of the tube with which it is associated and a condenser of such size that it can be quickly charged up when the plate current increases due to a reduction in the grid voltage. Thus, if the amplitude of the current flow through the output circuit of tube 6 or 16 is suddenly increased and then restored to its normal value, condenser 10 or 20, as the case may be, will be charged to a value corresponding to the change in amplitude and this charge will be retained for a comparatively long period of time, the duration of which is determined by the rate at which the charge stored in the condenser can leak off through the high resistance 9 or 19. This characteristic of circuits 9—10 and 19—20 is utilized, as will appear from the following description, to control a device which indicates the presence in the line of "hits" above the prescribed maximum and also those below the prescribed minimum.

The circuit of tube 26 is designed to operate as a peak voltmeter and is used to indicate the voltage between selected points on the leak resistances 9 and 19. A current of predetermined amplitude flowing through the output circuit of tube 26 produces a voltage drop across the resistance 30, whereby the terminal of this resistance connected to the grid of tube 26 is negative with respect to the cathode. Application of this negative potential to the grid of tube 26 serves to limit the current flowing through its output circuit to the desired value.

Cathode 21 of control tube 16 is connected by a conductor 24 to that terminal of the resistance-condenser combination 9—10 which is associated with the negative terminal of the source 7 supplying space current to tube 6.

A contact 25, adjustable along resistance 9, is connected to the grid of a vacuum tube 26, and a contact 27, adjustably engaging resistance 19, is connected to the cathode of tube 26 through resistance 30. The output circuit of this tube includes a source 28 for supplying space current to tube 26 through a meter 29. The latter may be of a recording type if desired.

With picture current, which varies between the prescribed minimum and maximum energy levels, transmitted over the line L, amplifier 1 supplies similarly varying currents to the circuits A and B. In circuit A, this current is rectified and the rectified current flows through the coupling resistance 5 and hence there is developed across this resistance a varying potential which is applied to the grid 13. At the same time, a current of greater than normal value is rectified in circuit B, and the rectified current flows through the coupling resistance 15 to develop across this resistance a varying potential which is applied to the grid 23.

When the amplitude of the picture current transmitted over the line is increased to the maximum prescribed limit, the amplitude of the rectified current supplied to the coupling resistance 5 in circuit A produces a maximum voltage drop across this resistance which is opposite in sign to the potential applied via the tap 12 to grid 13 and hence, at this time, the space current of tube 6 will be a maximum. At the same time, the rectified current supplied to the resistance coupling 15 in circuit B produces across this resistance a voltage drop which is of the same sign as the potential applied via the tap 22 to the grid 23. However, since a relatively high negative potential is normally applied to grid 23 to maintain the current flow through the output circuit at a low value, the application of the voltage drop across resistance 15, which serves to increase the negative potential applied to grid 23, will produce only a slight reduction in the amplitude of the current flowing through the output circuit of tube 16.

Similarly, when the picture current transmitted over the line decreases to the minimum prescribed limit, the voltage across resistance 15 will drop to a fairly low value, the grid 23 of tube 16 will have impressed on it a negative potential which is comparatively low, and hence the space current flow through tube 16 will be maximum when the picture current reaches the minimum limit.

In view of the fact that each time the level of the energy in the line reaches either the prescribed maximum or the prescribed minimum signal value, the respective control or measuring circuit operates to cause the peak voltmeter to produce an indication or record, the apparatus described above may be used to monitor the operation of the channel and thereby determine its suitability for the transmission of the signal.

When a "hit" occurs in the line and is of such magnitude as to cause the level of the transmitted energy to be suddenly increased to a value above the prescribed maximum limit, an abnormally large current will flow through the resistance 5 and 15, the grid of tube 6 will be made more positive and a comparatively large current of brief duration will flow through its output circuit including resistance 9 and condenser 10, and the condenser will be charged to a high value in a very short time. This charge will leak off gradually through the high resistance 9. At the same time, a correspondingly large rectified current will flow through resistance 15, but in a direction to cause the negative potential applied to the grid 23 to be increased, and thereby cause current flowing through the output circuit of tube 16, which includes resistance 19 and condenser 20, to be only slightly reduced.

If a "hit" occurs, which causes the level of the energy transmitted over the line L to be suddenly reduced to a value below the minimum prescribed limit, an abnormally low current is supplied to the circuits A and B. In circuit B the current supplied by the amplifier 3a will be rectified by 14 and an abnormally low rectified current will flow through the resistance 15. This allows grid 23 to become less negative than usual and a comparatively large current is caused to flow for a brief interval through the output circuit of tube 16, which includes resistance 19 and condenser 20, whereby the latter is charged to a higher than normal value in a short time and this charge is maintained until it can leak off through resistance 19. Simultaneously therewith a correspondingly low rectified current flows through the resistance 5, but although this causes the space current of tube 6 to be low for a short interval it has practically no overall effect since condenser 10 maintains the voltage substantially the same across resistance 9.

The two resistances 9 and 19 being respectively connected in shunt to the condensers 10 and 20 and being connected in series with each other by conductor 24, a change in the flow of current in the output circuit of either of the control tubes 6 and 16 will result in the production of a difference of potential between contacts 25 and 27 which is the sum of the potential changes produced at the points engaged by them on resistances 9 and 19, respectively.

In the case of a sudden increase in the level of the energy transmitted over line L above the maximum prescribed limit, the plate current of tube 6 will increase and hence an increased charging current will be applied to condenser 10, point 25 will be made more positive and this condition will persist until the charge in condenser 10 discharges through resistance 9. In tube 16, the plate current will decrease due to the increase in input but the current in resistance 19 will be maintained by the discharge from condenser 20 and thus the voltage at point 27 is not changed appreciably. As a result, an increased positive potential will be applied to the grid of tube 26, and its plate current will increase.

If the level of the signal drops below the prescribed value, however, the current in tube 16 will increase and that in tube 6 will decrease. Condenser 10 will maintain the current in resistance 9 but condenser 20 will be charged to a high value. In this case, the voltage at point 25 will not change appreciably but the voltage at point 27 will become more positive. This will also cause the potential applied to the grid of tube 26 to be more positive and hence an increased current will flow through meter 29.

The circuit shown in Fig. 2, which may be substituted for the portion of the circuit to the right of section line X—X in Fig. 1, differs from the portion which it replaces merely in this, that the conductor 24 is omitted and a common source 31 is used to supply space current for the control tubes 6 and 16, the negative terminal of this source is connected to the corresponding terminals of the resistance-condenser combinations 9—10 and 19—20, respectively included in the output circuits of tubes 6 and 16, and the output circuit of tube 26 includes a meter 32 having a zero scale marking substantially at the mid-portion of the scale. The needle of this meter is deflected to the zero reading when it is energized by direct current of a certain amplitude from source 28 and the needle is deflected in one direction with respect to the zero reading when the current through the meter is decreased and in the other direction when the current is increased with respect to the current value which produces the zero reading.

The control tubes 6 and 16 in this circuit operate in the manner described above with respect to Fig. 1. Thus when a "hit" occurs which raises the energy level in the line above the maximum prescribed limit, the grid 13 of tube 6 becomes more positive, the condenser 10 is charged and the potential of contact 25 is made more positive. At the same time, the grid 23 of tube 16 has an increased negative voltage applied to it and the current flowing through its output circuit is reduced. The potential at contact 27 is maintained by the discharge of condenser 20, however, and changes only slightly. Thus, the net effect is to make the grid of tube 26 more positive with respect to its cathode and increase the current in its plate circuit.

On the other hand, if a "hit" occurs in the line, which reduces the energy level therein below the minimum prescribed limit, the potential applied to grid 13 will be made more negative than normal and the current flow through its plate circuit will be decreased but the potential at contact 25 will be maintained by the discharge from condenser 10. At the same time, the grid 23 will be made less negative and the resultant increase of current in the plate circuit of tube 16 will charge condenser 20 and make contact 27 more positive. The net result will be to make the grid of tube 26 more negative and reduce the current supplied to meter 32.

In other words, the circuit of Fig. 2 operates to not only record the presence of "hits" in the line but also to indicate the character of the "hit" which affects the indicator.

According to Fig. 3, the control tubes 6 and 16 operate in the same manner as in Fig. 1, but the output circuit of each tube is connected to a vacuum tube which controls a meter of the type included in Fig. 1. In case of a "hit" which raises the energy level in the line beyond the maximum prescribed limit, the indicator 32, controlled by tube 26 will register an appreciable deflection, whereas the decrease in deflection produced in indicator 34, controlled by the tube 33 will be small. When a "hit" which reduces the level of the energy below the minimum prescribed limit occurs, the vacuum tube 33 will cause the meter 34 to register an appreciable deflection, but the decrease in deflection of meter 32 will be insignificant.

By observing or recording the deflections of the two meters, the character of the respective "hits" and also the magnitude of each "hit" may be ascertained.

Fig. 4 illustrates a somewhat different embodiment of the invention which may be used to indicate level changes due to "hits" which cause the energy level of incoming signal currents to increase above the maximum prescribed limit or to decrease below the minimum prescribed limit.

The incoming energy diverted from the line is supplied to circuits C and D. The former includes a transformer and an amplifier 40 which is coupled by a repeating coil 41 to a rectifier 42 comprising two vacuum tubes connected in balanced relation to the secondary winding of coil 41. This rectifier is adapted to supply rectified current to a condenser 43 shunted by a large leak resistance 44, and the voltage drop across the condenser 43 is applied to a peak voltmeter including a vacuum tube 45 and a meter 46. The condenser and leak resistance combination 43—44 thereby serves to control the operation of the peak voltmeter. Space current is supplied to the device 45 by a source 47, the negative terminal of which is connected through ground and resistance 48 to its cathode, and the voltage drop across a portion of this resistance is applied via the leak resistance 44 to its grid, whereby a negative voltage is applied to the grid so as to hold the space current through the tube at a low value when there is no added voltage present across resistance 44.

When the amplitude of the alternating current supplied to the input circuit exceeds a predetermined value, which, in this case, is the prescribed maximum value of the received picture current, a current flows in resistance 44 and condenser 43 is charged up in a brief interval of time, and the grid of tube 45 is made less negative. This causes more current to flow in its plate circuit and through the meter 46. The charge applied to the condenser cannot leak off through the tubes 42, because they are non-conductive for current flow in that direction, therefore it must discharge through the resistance 44. As this resistance is very large compared to the plate-to-cathode impedance of tubes 42, the charge will be maintained in the condenser for a period of time which is long compared with the charging time.

Circuit D includes a vario-repeater 68, comprising a plurality of copper oxide elements adapted to be supplied with alternating current of fixed amplitude from a local source 49 through a repeating coil 50, an amplifier 51 coupled to the output circuit of the amplifier 1 (shown on Fig. 1) by a repeating coil 52 and having its output circuit coupled by a repeating coil 53 to a full wave rectifier 54, comprising a plurality of copper oxide elements. The terminals of the secondary winding of coil 53 are connected to one pair of diagonal terminals of the rectifier 54 which has its other pair of diagonal terminals connected to one pair of diagonal terminals of the copper oxide elements constituting the vario-repeater 68, which in turn has its other diagonal terminals connected by the repeating coil 50 to the local source 49. The output circuit of the vario-repeater is connected by means of an amplifier 55 to a balanced rectifier 56, adapted to control the charge applied to a condenser 57 which is shunted by a large leak resistance 58, the associated condenser and resistance being included in the input circuit of a peak voltmeter 59. The combined rectifier-peak voltmeter circuit is identical in design and operation with that included in circuit C.

In circuit D element 68 constitutes a variable impedance network connected in shunt to the circuit over which alternating current is transmitted from the local source 49 to the amplifier 55, and the rectifier 54 operates to control the impedance of the network and thereby to regulate the amplitude of the alternating current supplied to amplifier 55. When the value of the energy supplied to the rectifier 54 increases, a larger amplitude of rectified current flows through the network 68 with the result that its impedance is decreased and hence the value of the alternating current shunted from the circuit, connecting the local source 49 and the amplifier 55, is increased and the amplitude of the alternating current transmitted to the amplifier 55 is decreased. On the other hand, if the amplitude of the received energy decreases, the impedance of the network 48 is increased and its shunting action for the locally supplied alternating current is reduced and hence the amplitude of the current supplied to the amplifier 55 is increased.

The operation of the arrangement including circuits C and D is broadly similar to that shown in Fig. 1, in that, while the incoming energy varies between the maximum and minimum prescribed limits, each circuit will be supplied with the incoming current but the amplitudes of this current will be such that the upper vacuum tube voltmeter will indicate the correct value of the maximum current and the lower one the correct value of the minimum current.

If, however, a "hit" occurs which increases the energy level of the current received from the line to a value above the prescribed maximum limit, the balanced rectifier in circuit C will supply a larger rectified current than normal to the condenser 43 which will then be charged to a new high value very quickly and meter 46 will indicate the rise in plate current thus produced. This charge will be retained in the condenser until it can leak off through the associated shunt resistance 44. At the same time the amplitude of the locally supplied alternating current transmitted to amplifier 55 will decrease with the result that the charging current supplied to the condenser 57 will be reduced. However, the charge on the condenser 57 will maintain the voltage across resistance 58 substantially normal for a considerable period of time, while it gradually discharges through resistance 58 and hence there will be little change in the plate current of tube 59.

If a "hit" develops in the line which serves to reduce the energy level below the prescribed minimum value, the amplitude of the rectified current supplied to the network 68 will be reduced and hence its impedance will be increased to correspondingly reduce its shunting action, with the result that a larger amplitude of the locally supplied current will be transmitted via the amplifier 55 to the balanced rectifier 56 and a larger rectified current will be applied to the condenser 57. This condenser will then be charged to a higher value very quickly, and this charge will be maintained for a relatively long time because of the presence of the associated high leak resistance. In circuit C this change of energy level will produce practically no effect, because the normal charge applied to the condenser 43 will maintain the voltage across resistance 44 substantially unchanged.

By observing the deflections of the two meters when a "hit" occurs and noting which one of them registers the deflection, as well as the swing of its needle, the character of the "hit" and also its magnitude may be ascertained.

The circuit of Fig. 4 may be operated in the manner disclosed in connection with Fig. 1 by disconnecting the lower terminal of resistance 48 from ground and connecting it to the cathode of the tube of the voltmeter 59 and utilizing this tube and tube 45 in a manner similar to tubes 6 and 16 for the purpose of controlling a peak voltmeter connected to the contacts 60 and 61.

By connecting the terminals 60 and 61 of the resistances associated with the cathodes of the tube 45 and the tube included in peak voltmeter 59 to an additional peak voltmeter and keeping the lower ends of these resistances grounded, the circuit of Fig. 4 may be used in the manner disclosed in connection with Fig. 2.

The device shown in Fig. 4 is preferable to that illustrated in Fig. 3, in general, because it is more stable and more positive in its action. One of the reasons for this is that in circuit C of Fig. 4, for instance, the condenser 43 is charged directly by the rectified alternating current instead of, as in circuit A of Fig. 1, being charged by the plate current of tube 6, which is controlled by the flow of rectified current in resistance 5. The charge applied to the condenser 43 of Fig. 4 then leaks off through resistance 44, which can be made extremely high. In circuit A of Fig. 1, on the other hand, resistance 9 cannot be made extremely high, because plate current has to flow through it in order to provide some negative bias across the upper portion of the resistance to limit the space current of the tube. Thus, the difference between charge-up time and discharge time in circuit C of Fig. 4 can be made almost as great as desired, whereas it is definitely limited in circuit A of Fig. 1.

Circuit D of the apparatus shown in Fig. 4 is superior to circuit B of Fig. 1 for somewhat the same reasons. The indicating device of circuit D is made similar to that of circuit C and is, in effect, a maximum indicator in which resistance 58 can be made as large as desired. This allows condenser 57 to be made quite small, while still providing for a relatively long discharge time period. This method of operation is obtained by reversing the circuit which causes the signal input to change the amplitude of locally supplied oscillations, so that a decrease in signal causes an increase in amplitude of the local oscillations. In circuit B of Fig. 1, on the other hand, as in circuit A, the size of resistance 19 is limited due to the fact that some plate current must flow through it, and this in turn limits the difference between the charge-up and discharge time of condenser 20.

Marginal relays may be included in the output circuit of the controlled or third tube in place of the meters for the purpose of controlling the operation of indicating devices.

While the invention has been herein disclosed as applied to a system in which picture signals are transmitted over a line, it will be apparent that the apparatus described above may be utilized to monitor the operation of communication channels adapted for the transmission of other types of signal currents which vary between fixed maximum and minimum limits and thereby determine their suitability for the transmission of such signals.

What is claimed is:

1. A method of monitoring the operation of a communication channel while there is being transmitted thereover alternating signaling current, the amplitude of which varies between a lower and an upper limit under normal conditions and beyond said limits under abnormal conditions, which method comprises producing a plurality of unidirectional currents having amplitudes controlled in accordance with the amplitudes of said signaling current and having lower and upper normal limiting values, and producing a certain indication in response to one of said unidirectional currents when its amplitude is greater than its normal upper limit only, and producing an indication in response to the other of said unidirectional currents which is distinguishable from said first indication when its amplitude is greater than its normal upper limit only.

2. A method of monitoring the operation of a communication channel while there is being transmitted thereover alternating signaling current, the amplitude of which varies between a lower and an upper limit under normal conditions and beyond said limits for brief periods under abnormal conditions, which method comprises producing a voltage change across a current path when the amplitude of said signaling current is greater than said upper limit, producing a voltage change across a different current path when the amplitude of said signaling current is less than said lower limit, maintaining said voltage changes for periods which are long relative to said brief periods and indicating said abnormal conditions in response to said voltage changes.

3. An apparatus for monitoring the operation of a communication channel over which is transmitted alternating signaling current the amplitude of which normally varies between a lower and an upper limit and which may have abnormal amplitude variations extending beyond one of said limits for a brief period occurring between periods of normal amplitude, a first condenser, means for rectifying a portion of said signaling current to produce a unidirectional current for quickly charging said condenser when the amplitude of said signaling current is increased to an abnormally high amplitude during a brief period and for maintaining said charge over a relatively long period, a second condenser, a source of alternating current, means for rectifying alternating current from said source to produce a unidirectional current for quickly charging said second condenser when the amplitude of said alternating current is increased to a high amplitude during a brief period said charge being maintained over a relatively long period, means under control of said signaling current to cause the amplitude of the current from said alternating current source supplied to said second mentioned rectifying means to be increased in response to a decrease in the amplitude of said signaling current, and a first and second voltage indicating means under control of the potential to which said first and second condensers respectively are charged, said voltage indicating means being incapable of responding to potential changes during the brief period in which one of said condensers is charged but which can respond during the subsequent period in which the charge on the condenser is maintained.

4. An apparatus for monitoring the operation of a communication channel over which is transmitted alternating signaling current the amplitude of which normally varies between a lower and an upper limit and which may have abnormal amplitude variations extending beyond one of said limits for a brief period occurring between periods of normal amplitude, a condenser, a source of alternating current, means for rectifying the alternating current from said source to produce a unidirectional current for quickly charging said condenser when the amplitude of said alternating current is increased to a high amplitude during a brief period, said charge being maintained over a relatively long period, means under control of said signaling current to cause the amplitude of the current from said alternating current source supplied to said rectifier to be increased in response to a decrease in amplitude of said signaling current, and a voltage indicating means under control of the potential to which said condenser is charged, said voltage indicating means being incapable of responding to potential changes during the brief period in which said condenser is charged but which can respond during the subsequent period in which the charge on the condenser is maintained.

5. In combination, a source of alternating current, peak amplitude measuring means, a circuit for supplying alternating current from said source to said peak amplitude measuring means, a variable impedance network for controlling the amplitude of the current in said circuit, a source of signaling current, and means under control of current from said source of signaling current for controlling the impedance of said network.

6. In combination, a source of current of substantially constant amplitude, peak amplitude measuring means, a circuit for supplying alternating current from said source to said peak amplitude measuring means, a variable impedance network connected in shunt with said circuit, a source of signaling current and rectifying means for supplying to said variable impedance network a unidirectional current the amplitude of which varies in accordance with the amplitude of said signaling current, thereby decreasing the impedance of said network as the amplitude of said signaling current is increased and vice versa.

DOREN MITCHELL.